United States Patent [19]

Kaply

[11] Patent Number: 6,112,215
[45] Date of Patent: Aug. 29, 2000

[54] DATABASE OR REPETITIVELY USED DATA ENTRIES DISPLAYABLE FOR SELECTION AND ENTRY ON A VARIETY OF USER INTERACTIVE INTERFACES FROM SOURCES INDEPENDENT OF SAID DATABASE

[75] Inventor: Michael Aaron Kaply, Austin, Tex.

[73] Assignee: International Business Machines Corporation, Armonk, N.Y.

[21] Appl. No.: 09/160,006

[22] Filed: Sep. 24, 1998

[51] Int. Cl.[7] ...................................................... G06F 15/00
[52] U.S. Cl. .......................... 707/507; 707/906; 345/352; 345/333
[58] Field of Search ............................... 345/333; 307/10, 307/507, 906

[56] References Cited

U.S. PATENT DOCUMENTS

| | | | |
|---|---|---|---|
| 4,831,526 | 5/1989 | Luchs et al. | 705/4 |
| 4,939,689 | 7/1990 | Davis et al. | 364/900 |
| 5,367,619 | 11/1994 | Dipaolo et al. | 395/149 |
| 5,640,577 | 6/1997 | Scharmer | 395/768 |
| 5,765,144 | 6/1998 | Larche et al. | 705/38 |
| 5,948,040 | 9/1999 | DeLorme et al. | 701/201 |

Primary Examiner—Raymond J. Bayerl
Assistant Examiner—David E. Brown
Attorney, Agent, or Firm—Jerry B. Kraft; Jeffrey S. LaBaw

[57] ABSTRACT

A system for the ease of use in making repetitively or frequently required data entries into interactive display interface pages or screens which includes a database of repetitively or frequently used data entries which may be ported to any displayable interface page or screen even though the interface page is provided from a source independent of and remote from the database holding the repetitive data entries. The system provides means for displaying on each of the plurality of interface pages or screens, a menu of items each representative of one of said plurality of repetitive data entries, and means for selecting on each displayed interface screen, at least one of said items to thereby make a data entry in a data entry field on said screen. The system is customizable to each particular user by permitting the user to modify the data entries in the portable database to satisfy the user's needs. In addition to Internet document systems, the invention is applicable to electronic mail systems. In the case of a global network, such as the Internet, the present invention may be operatively associated with the Internet browser or even form a component of the browser.

21 Claims, 10 Drawing Sheets

Customizing Lotus Domino Intranet Starter Pack

Customize the installation of Lotus Domino Intranet Starter Pack for...

Configuration information

Administrator's user name — 80
http password — 81
Destination path
Data directory
Internet domain name
Proxy server (optional)
Proxy server port number (optional)
SMTP mail gateway (optional) — 87

91 — MY DATABASE
92 — name
        http pass w
        data directory
        SMTP Mail Gate
        Proxy Server
        I-NET Domain
        Address
        Manager
        FAX
        Local Phone
        e-mail name
        General ID
        SS #
        dob
        Terminal name
        Registered User

93

88 — Component selection...

<Back   Next >   Cancel   Help

DATABASE OR REPETITIVELY USED DATA ENTRIES DISPLAYABLE FOR SELECTION AND ENTRY ON A VARIETY OF USER INTERACTIVE INTERFACES FROM SOURCES INDEPENDENT OF SAID DATABASE

TECHNICAL FIELD

The present invention relates to user-interactive computer supported display technology, and particularly to such user-interactive systems and methods which provide interactive users with user friendly interfaces for data entry.

BACKGROUND OF THE INVENTION

The 1990's decade has been marked by a technological revolution driven by the convergence of the data processing industry with the consumer electronics industry. This advance has been even further accelerated by the extensive consumer and business involvement in the Internet over the past few years. As a result of these changes it seems as if virtually all aspects of human endeavor in the industrialized world requires human/computer interfaces. There is a need to make computer directed activities accessible to a substantial portion of the world's population which, up to a few years ago, was computer illiterate or, at best, computer indifferent.

One function which developers of display interfaces have been addressing is ease of use in the entry of data, and particularly the entry of textual data. No matter how intuitive and easy to use an interface may be in its use of icons and related images to make even the novice user feel at home with the interface, in most human/computer transactions a point is reached when the user must enter data, particularly text data. Unfortunately, most people have limited capabilities with the keyboard which still remains the primary means for entering text into a computer display interface. The user is usually slowed down by the entry of text or related data. This is magnified when the user has to enter the same data repetitively: again and again. In many systems, each time the user needs to access an independent database or even a function, the user must enter a considerable amount of sign on or access information, e.g. names, addresses, IDs, passwords, phone numbers, account numbers, domain names, E-mail addresses etc. This is particularly troublesome when the user is browsing via the Internet where it seems that at every level and Web site, at least some of the same information has to be entered again and again and again. The prior art has described systems in which repetitively used data entries have been stored in the same database along with a variety of display pages or forms which use such entries and then entered into the forms as required. U.S. Pat. Nos. 5,367,619 and 5,640,577 describe such databases. While such systems are effective when both the forms requiring the repetitive data and the data entries themselves are stored in the same database, they have substantially no use for interactive display systems which interface with displayed pages from sources independent of the database entries. This is particularly the situation where the interactive computer display is accessing a wide variety of remote databases through networks, especially the Internet.

SUMMARY OF THE INVENTION

The present invention provides a solution to the above problems through a system which provides a database of repetitively or frequently used data entries which may be ported to any displayable interface page or screen even though the interface page is provided from a source independent of and remote from the database holding the repetitive data entries. The system provides means for displaying on each of the plurality of interface pages or screens, a menu of items each representative of one of said plurality of repetitive data entries, and means for selecting on each displayed interface screen, at least one of said items to thereby make a data entry in a data entry field on said screen. The system is customizable to each particular user by permitting the user to modify the data entries in the portable database to satisfy the user's needs. In addition to Internet document systems, the invention is applicable to electronic mail systems. In the case of a global network such as the Internet, the present invention may be operatively associated with the Internet browser or even form a component of the browser.

DETAILED DESCRIPTION OF THE PREFERRED EMBODIMENT

Figure 1:
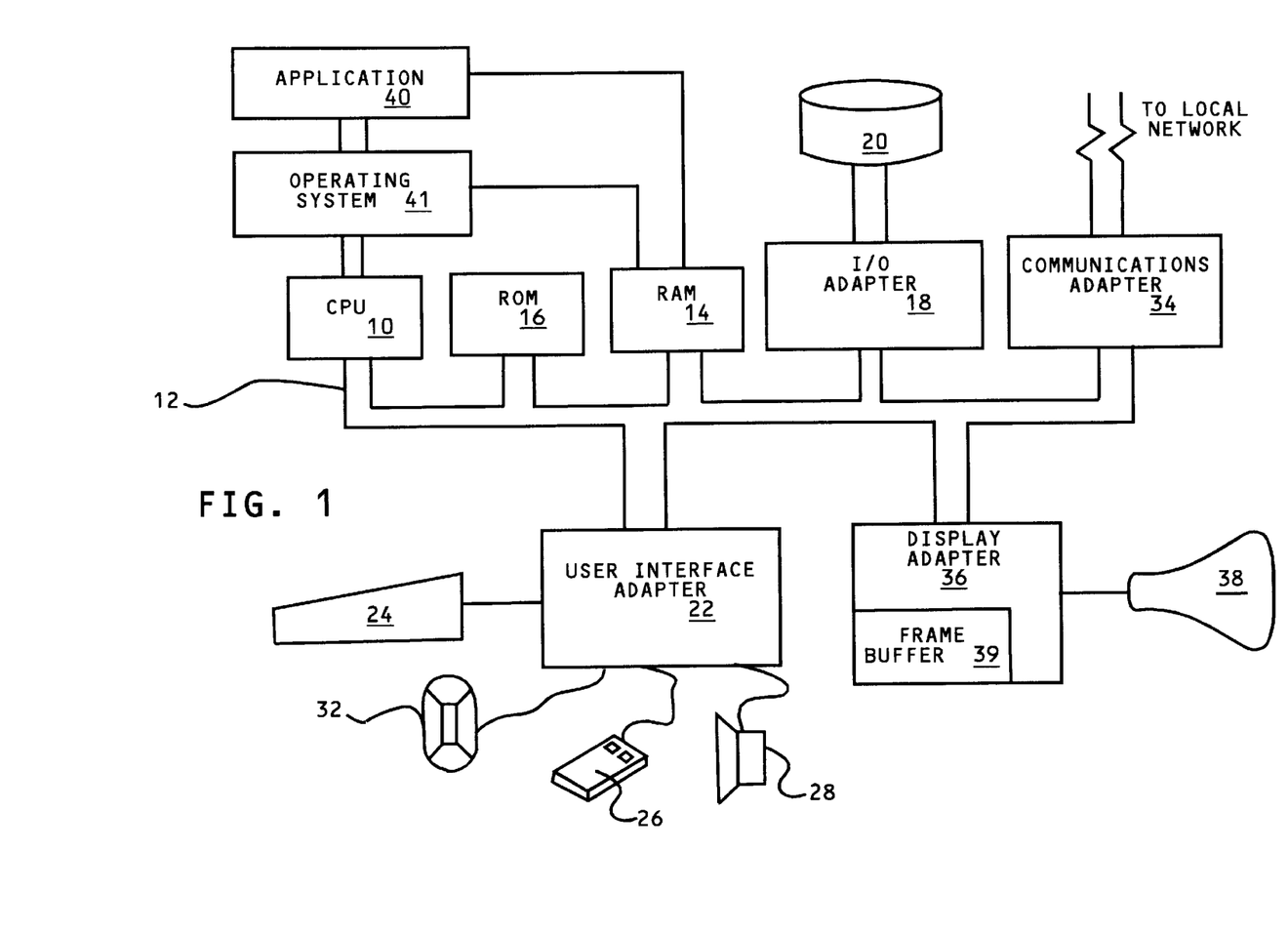
FIG. 1 is a block diagram of a data processing system including a central processing unit which is capable of implementing a local interactive display of the present invention.

Referring to FIG. 1, a typical data processing system is shown which may function as the local computer controlled display terminal used in implementing the system of the present invention by presenting a menu driven database of commonly and repetitively needed data entries which is independent of the application programs being implemented or other databases which may be supporting the application programs or their interfaces. A central processing unit (CPU) 10, such as one of the PC microprocessors available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the OS/2™ operating system available from IBM (OS/2 is a trademark of International Business Machines Corporation); Microsoft's Windows 95™ or Windows NT™, as well as UNIX or AIX operating systems. A program for developing and presenting a menu representative of a set of repetitively needed data entries, application 40, to be subsequently described in detail, runs in conjunction with operating system 41 and provides output calls to the operating system 41 which implement the various functions to be performed by the application 40.

A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. It should be noted that software components, including operating system 41 and application 40, are loaded into RAM 14, which is the computer system's main memory. I/O adapter 18 may be a small computer system interface (SCSI) adapter that communicates with the disk storage device 20, i.e. a hard drive; the database of repetitively required data entries may be conveniently stored on the disk device 20. Communications adapter 34 interconnects bus 12 with an outside network enabling the data processing system to communicate with other such systems over a local area network (LAN) or wide area network (WAN), which includes, of course, the Internet. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user may bring up the menu to access the database of repetitively required data entries, and to make such entries into requisite entry fields in the user interactive display interface screens of a variety of application programs and systems. Display adapter 36 includes a frame buffer 39, which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38. In the preferred embodiment, which will be subsequently described, the mouse will be the input means through which the user will interface with the system.

In this implementation of the invention, it will frequently be the case that the programs with display interfaces requiring repetitive data entries will be transmitted by or otherwise involve communication with other nodes within a network. The display terminal of FIG. 1 communicates with the network through the communications adapter 34. Since many of the aspects of the present invention involve access via networks, some background with respect to networks would be appropriate at this point. We will not go into great detail in describing the networks to which the present invention is applicable. U.S. Pat. No. 5,295,244, Dev et al., and U.S. Pat. No. 5,353,399, Kuwamoto et al., adequately detail conventional networks to which the present invention would be applicable, including appropriate network management and display terminal access to such networks. Reference has also been made to the applicability of the present invention to a global network such as the Internet.

For details on Internet nodes, objects and links, reference is made to the text, "Mastering the Internet", G. H. Cady et al., published by Sybex Inc., Alameda, Calif., 1996.

Any data communication system which interconnects or links computer controlled systems or network elements at various sites or network nodes defines a communications network. A network may be as simple as two linked computers or it may be any combination of LANs or WANs. Of course, the Internet is a global network of a heterogeneous mix of computer technologies and operating systems. At each level in a network hierarchy, the unit may be considered as a local network unit at which the present invention may be implemented. For example, since the Internet connects networks of computers, a particular corporate network could be such a localized Internet element. Also, the particular LAN of each department in the corporate network could be a localized unit. At high levels, regional networks representative of cities could be considered to be the localized units to which this invention is applicable. Likewise, elements linked together by function to form localized networks characterized by functions as accounts receivable/payable or video-on-demand distribution.

Figure 2:
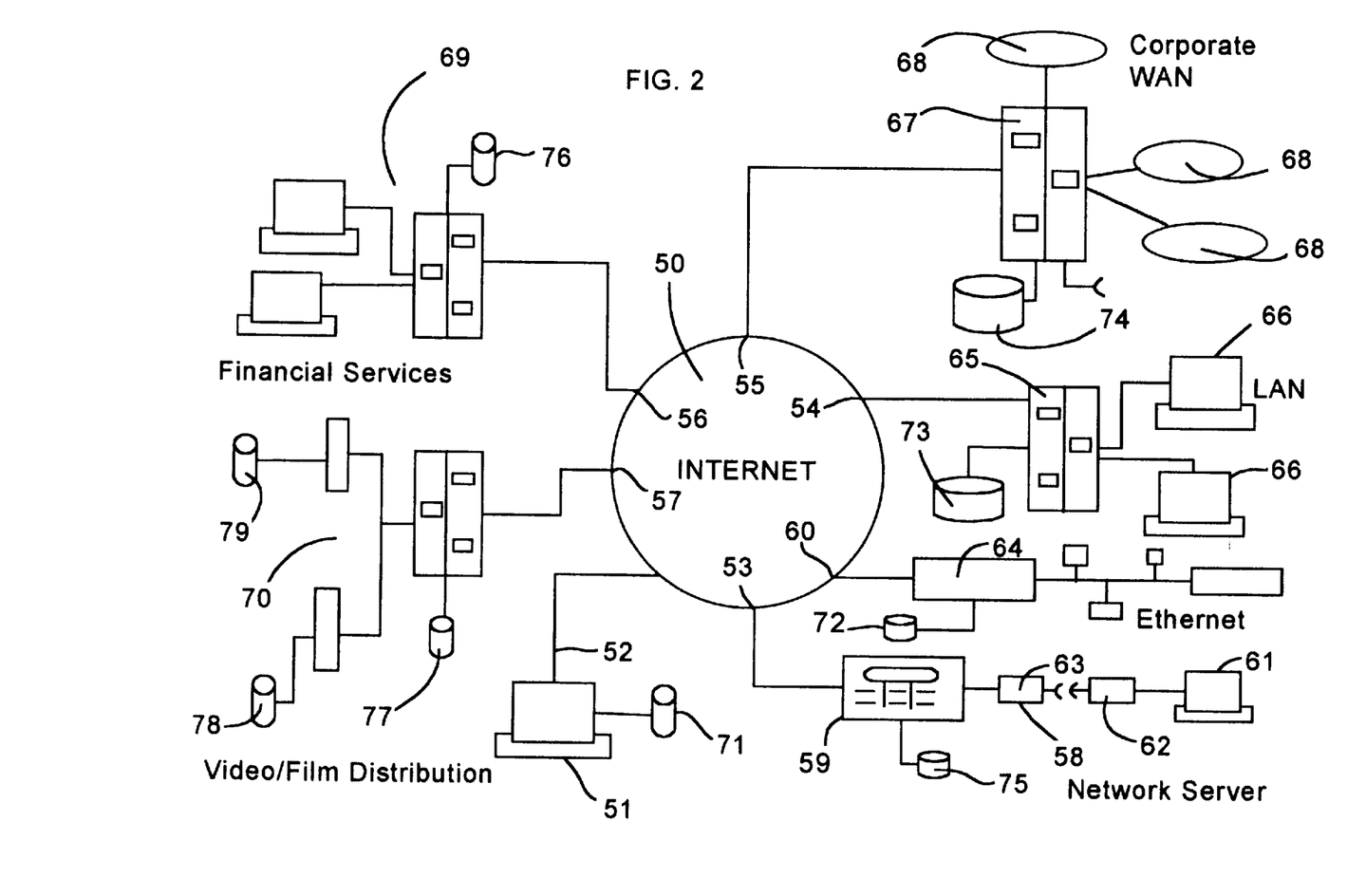
FIG. 2 is a generalized diagrammatic view of an Internet portion showing the local nodes in which the present invention may be implemented.

As a very general example of a network in which error messages from a variety of programs used in the network may be enhanced and error conditions modified in accordance with the present invention, reference is made to FIG. 2 which is a generalized diagram of a portion of the Internet to which the computer controlled display terminal 51 may be used, for example, to receive the various interactive display interfaces requiring the repetitive data entries in order to access other sites, programs and databases on the network. Terminal 51 is the computer system shown in FIG. 1, and connection 52 (FIG. 2) is the network connection shown in FIG. 1. Some typical major elements connected to the Internet are user network 58 connected through server 59 at node 53. In such a server network, the individual users' workstations 61 are connected through telephone modems 62 and 63 to the server 59. Of course, at the next level, each of the user workstations 61 may be considered as network elements. Among the other illustrative network elements are ethernet 64 at node 60 and a LAN at node 54 consisting of server 65 and workstation 66. At node 55, the connected element is a corporate WAN consisting of network server 67 and subnetworks 68. In addition, functional networks, such as financial services network 69 and video/film distribution network 70, may be considered as objects respectively connected at nodes 56 and 57. It should be noted that a variety of databases, 72 through 79, are illustrated associated with network elements at various levels. These databases represent the various locations and repositories from which libraries may be accessed and data obtained, particularly in processes accessing a database or library. Access to these databases may often require the user at terminal 51 to go through a variety of accessing display interface screens, each requiring the entry of repetitive data. The menu driven database of the present invention is directed to helping the user in such data entry; it is illustratively shown as database 71 associated with terminal 51. It is important to note that the data entry information in database 71 is completely independent of the various sources, e.g. databases 72 through 79 which provide the display interfaces requiring the data entries to display terminal 51.

There will now be described a simple illustration of the present invention with respect to the display screens of FIGS. 3 through 8. When the screen images are described, it will be understood that these may be rendered by storing image and text creation programs, such as those in any conventional window operating system in the RAM 14 of the system of FIG. 1. The operating system is diagrammatically shown in FIG. 1 as operating system 41. The display screens of FIGS. 3 through 7 are presented to the viewer on display monitor 38 of FIG. 1. In accordance with conventional techniques, the user may control the screen interactively through a conventional I/O device such as mouse 26 of FIG. 1, which operates through user interface 22 to call upon programs in RAM 14 cooperating with the operating system 41 to create the images in frame buffer 39 of display adapter 36 to control the display on monitor 38.

Figure 3:
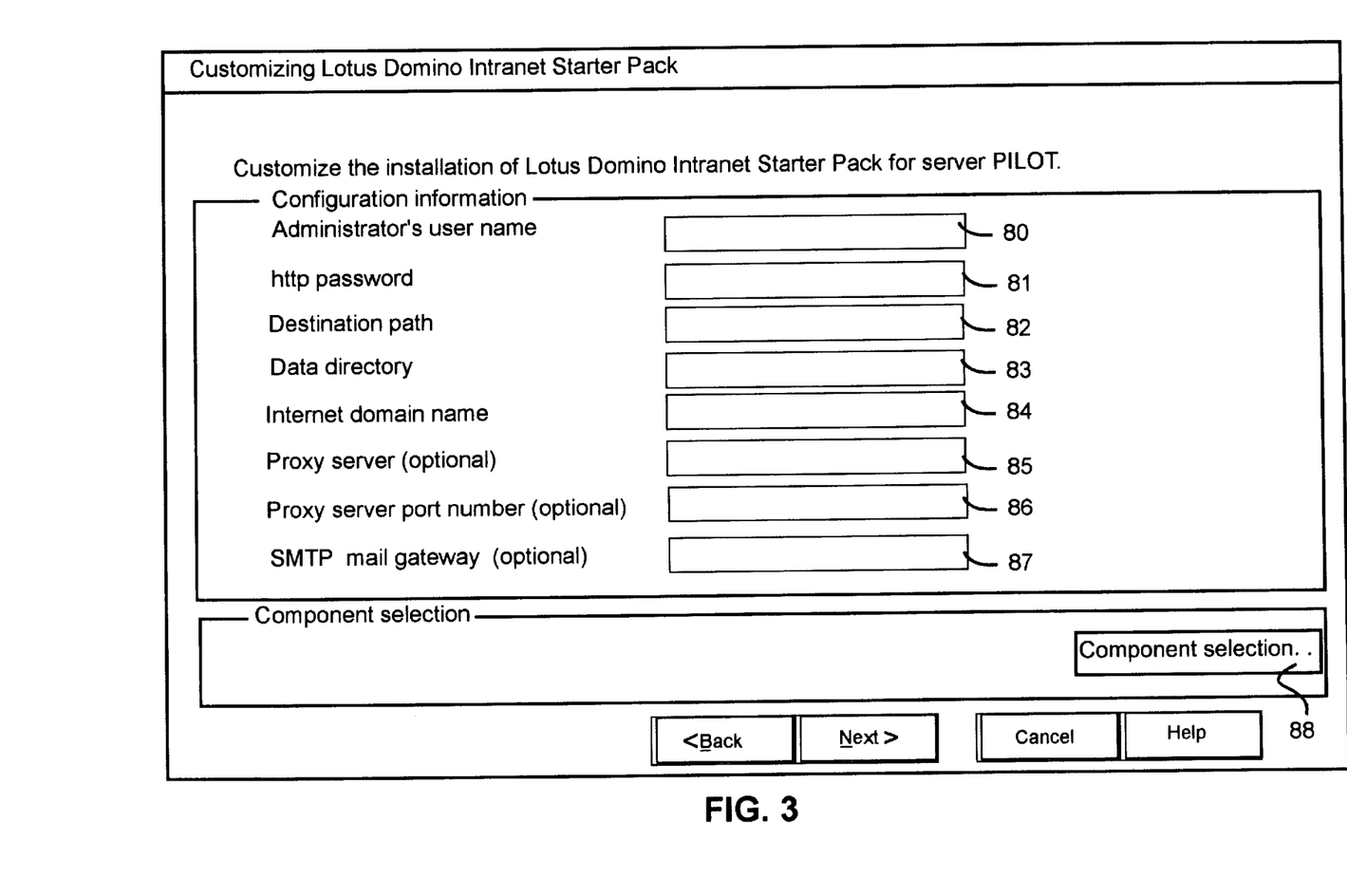
FIG. 3 is a diagrammatic view of a display screen on which an interface to initialize a user selected program is presented.
Figure 4:
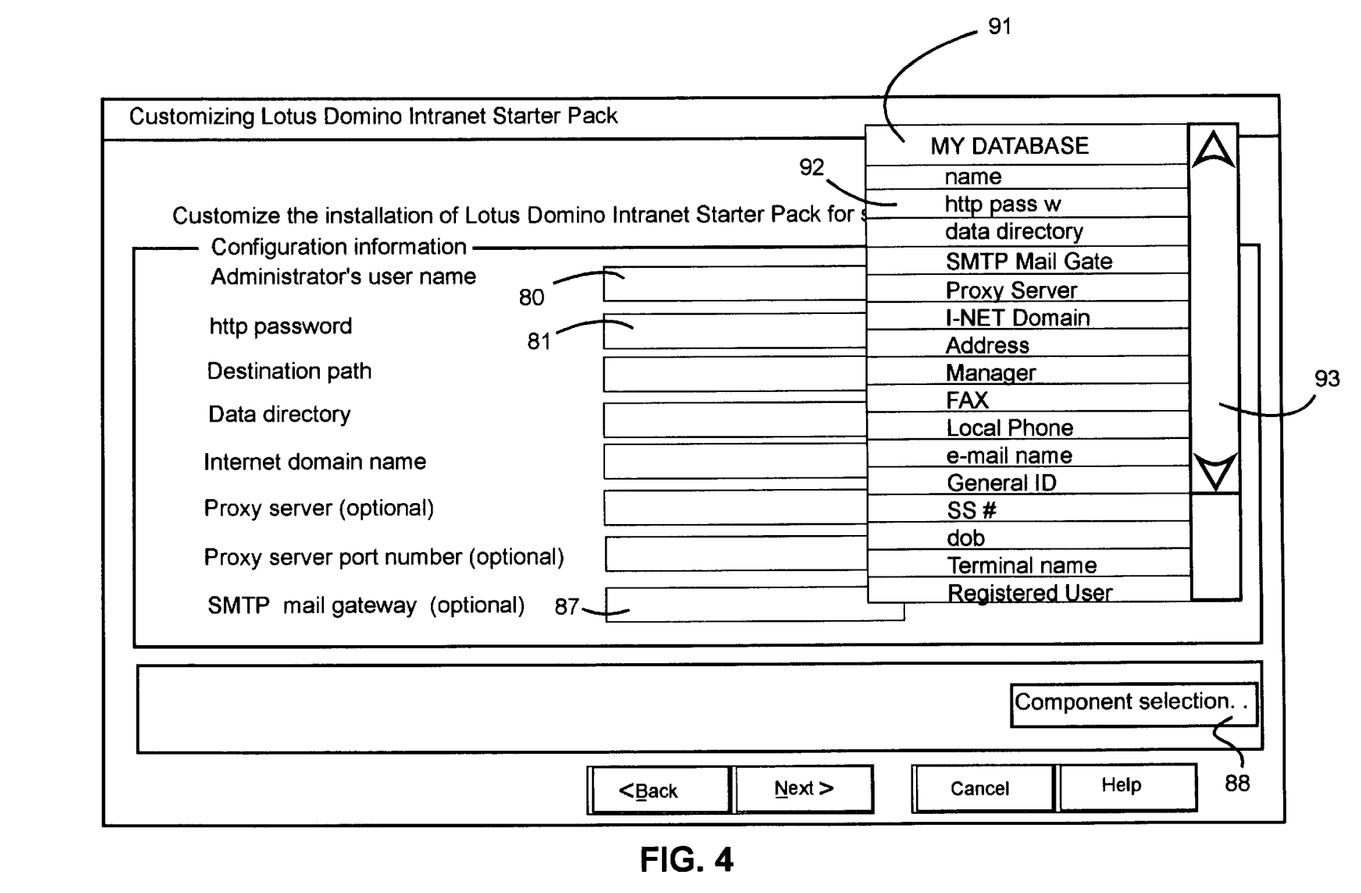
FIG. 4 is the display screen view of FIG. 3 with an interactive menu brought up by the user to selectively access frequently required data entries.
Figure 5:
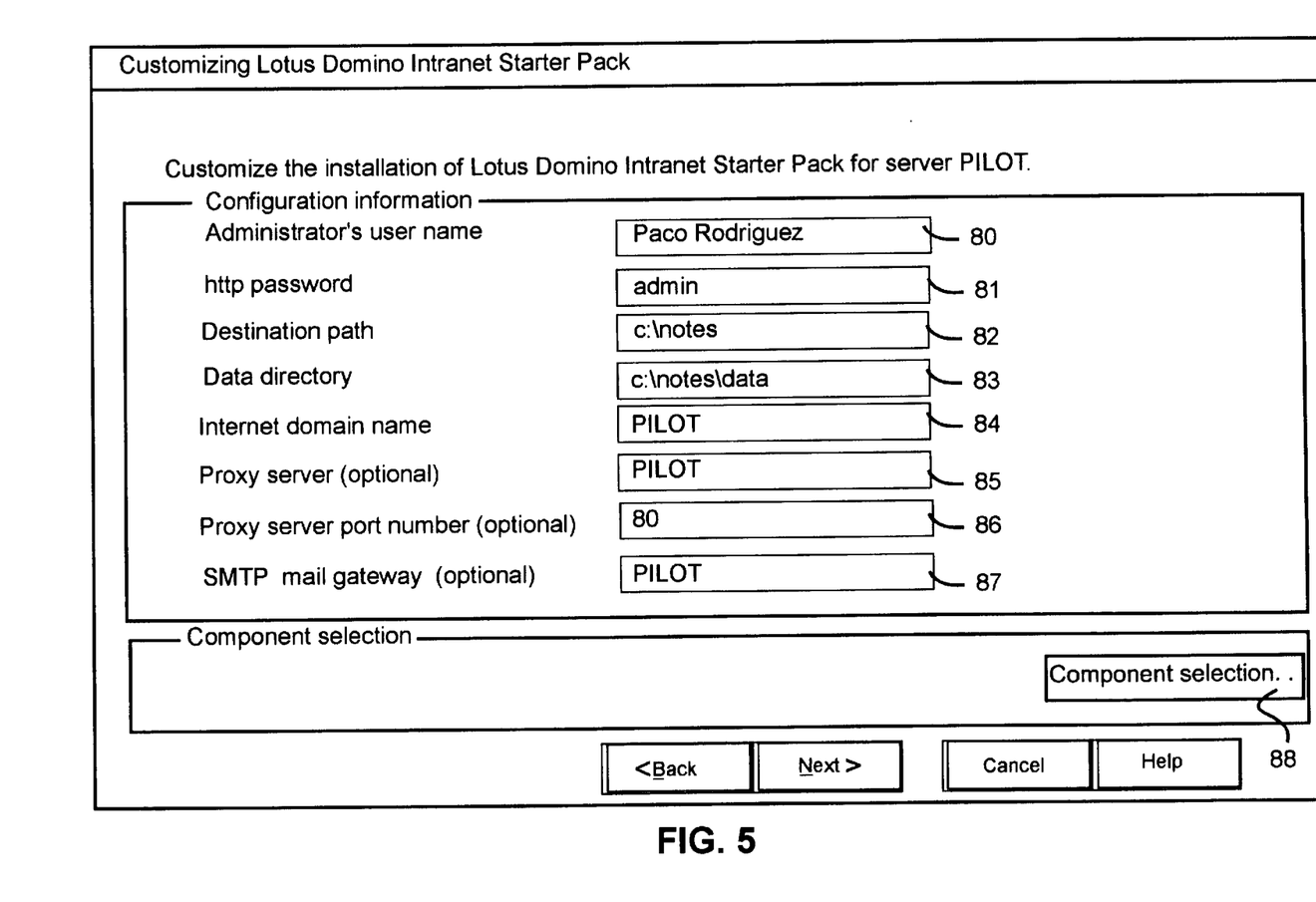
FIG. 5 is the display screen view of FIG. 3, in which data entries selected from the menu of FIG. 4 have been made.

The initial display screen of FIG. 3 shows a display screen typical of initial display screens which could come up whenever the interactive user is initializing a new program, accessing a system or accessing a network database. In the present example, access to a Lotus™ Internet service is being initialized. The user is being prompted to enter data for name, password, path, directory, Internet domain, proxy server, proxy server port and SMTP mail gateway, respectively into data entry fields 80 through 87. Normally, such entries would be made via cursor/keyboard techniques with button 88 confirming the entry into a particular field. In browsing the Internet, accessing particular databases and arranging to be billed for Internet services, it may be seen that much of this information is repetitive and needs to be entered again and again, many times. However instead of conventionally keying in such data entries, in the present invention, the interactive user brings up menu 91, FIG. 4, by any standard mouse or keyboard means. The menu which is scrollable via scroll bar 93 has dozens or more of data items which are normally requested again and again. It is representative of a database of such items which is stored independently of any application program or database, e.g. database 71 associated with local terminal 51, FIG. 2. Using the mouse, scrollbar 93 and selection button, the user points out and transfers appropriate selected data entries from the menu to appropriate fields 80 through 87 to produce the completed data entry screen shown in FIG. 5.

Figure 6:
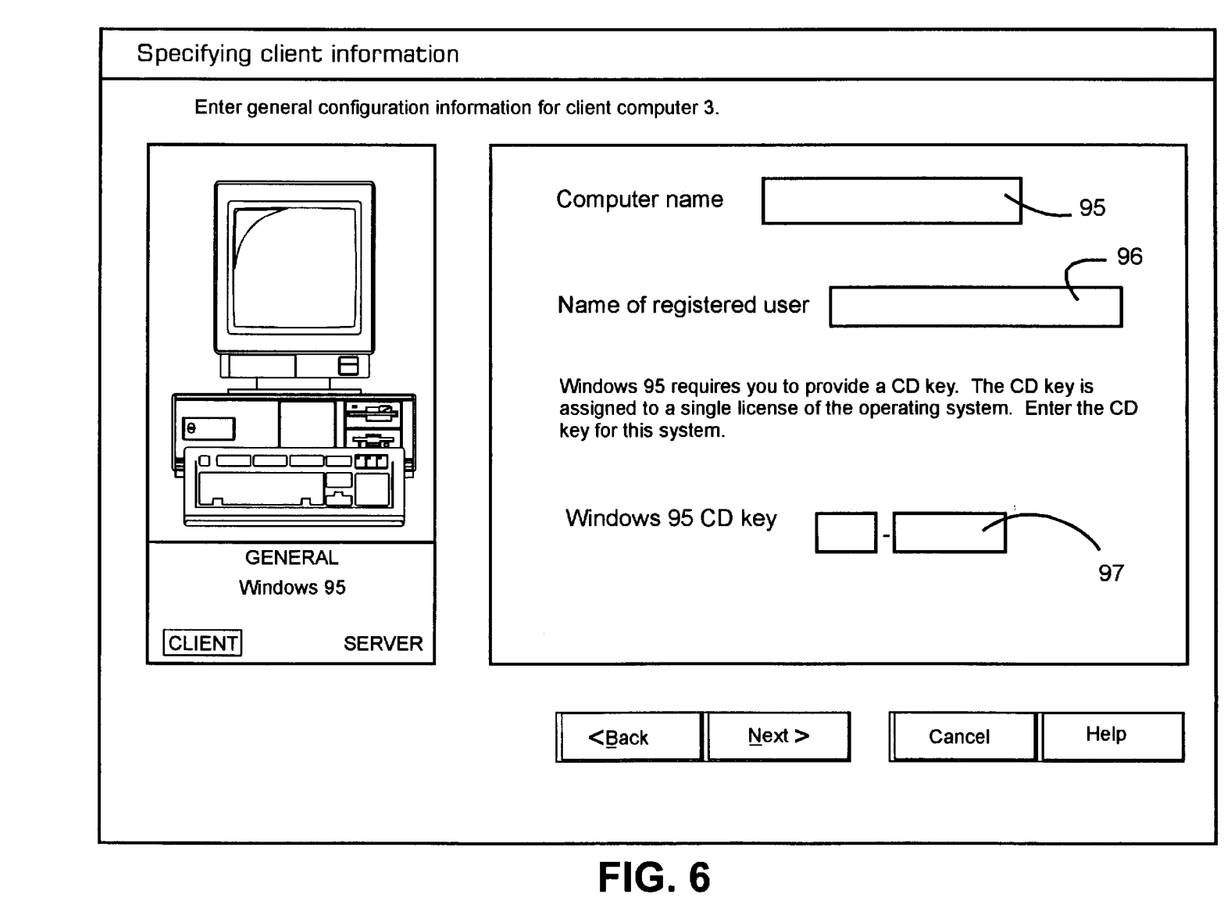
FIG. 6 is a diagrammatic view of a display screen on which an interface to initialize another user selected illustrative program is presented.
Figure 7:
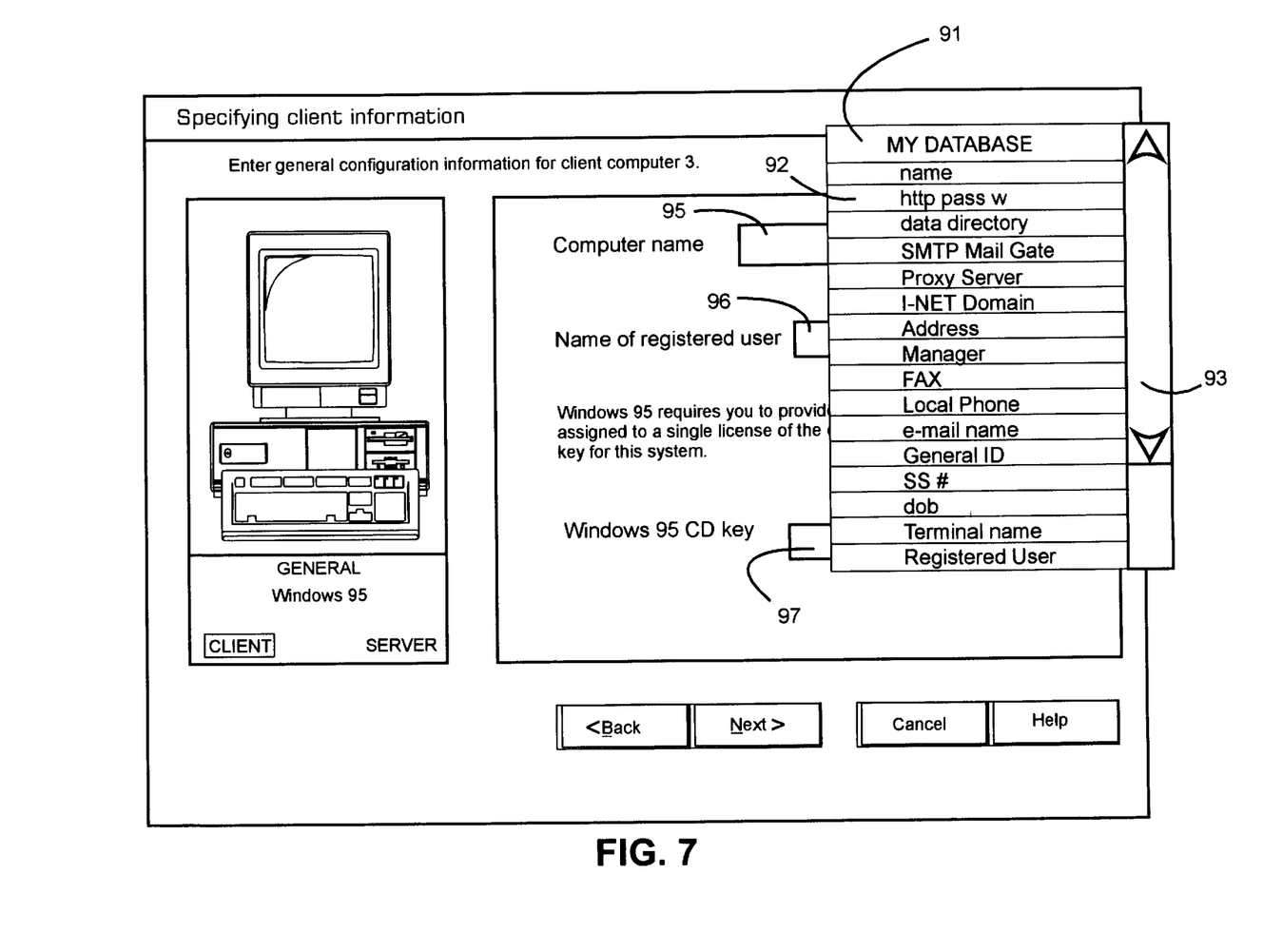
FIG. 7 is the display screen view of FIG. 6 with an interactive menu brought up by the user to selectively access frequently required data entries.
Figure 8:
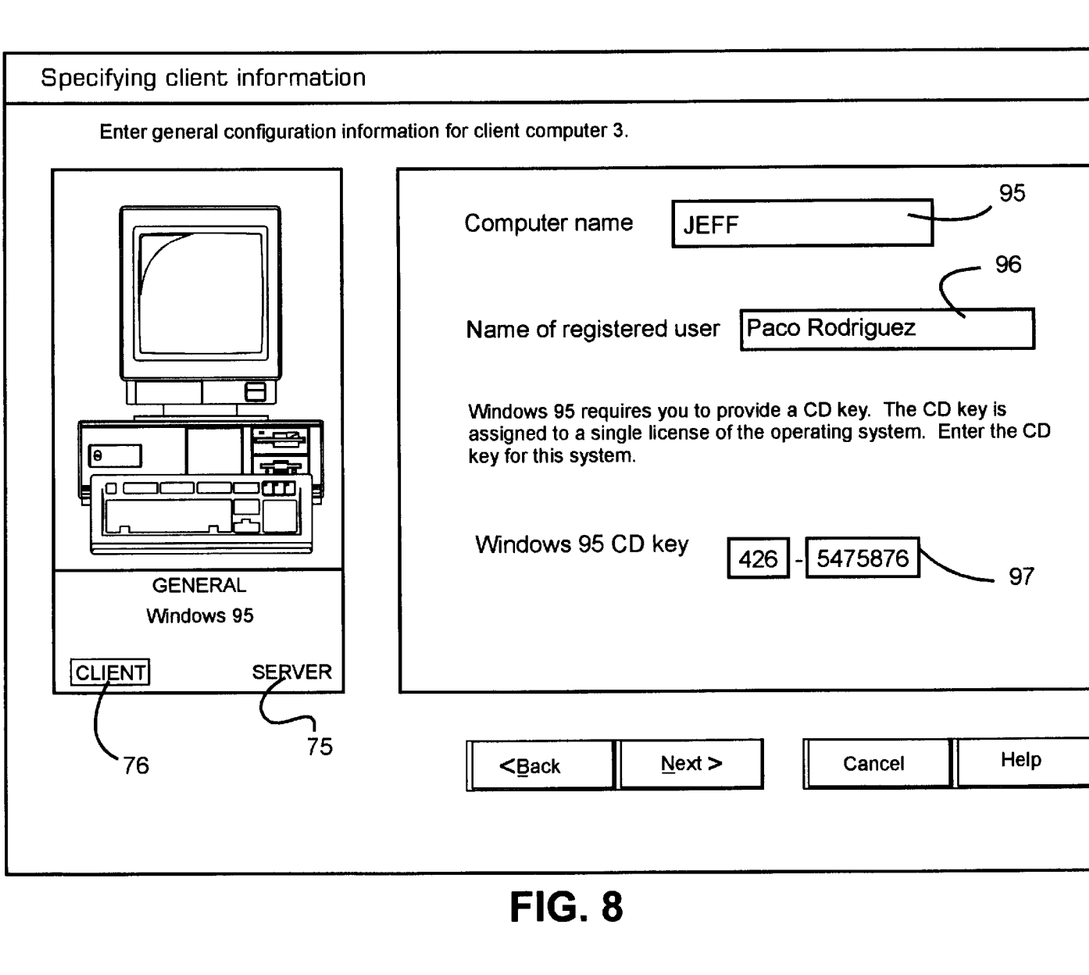
FIG. 8 is the display screen view of FIG. 6 in which data entries selected from the menu of FIG. 4 have been made.

A similar initial data entry screen for the initiation of a windows system is shown in FIG. 6. The user is being prompted for repetitive information as the computer name 95, user name 96 and a licensing key 97. Here again, as shown in FIG. 7, menu 95 is brought up and appropriate selections 92 are made and entered into fields 95 through 97 to provide the completed initial display screen shown in FIG. 8.

While the invention has been illustrated with respect to entering initial data with respect to two interfaces, FIGS. 3 through 5 and FIGS. 6 through 8, it should be understood that the independent database of the present invention may be used to enter repetitive and frequently used data entries into the interface display screens of any system requiring such entries. Since the database supporting the present system is completely independent of the databases providing the interfaces, the menu of the present invention representative of the items of the database may be superimposed on any interface display screen requiring data entries and the information transferred from the database into the selected appropriate data entry fields in the display screen by any conventional means, e.g. "drag and drop".

Figure 9:
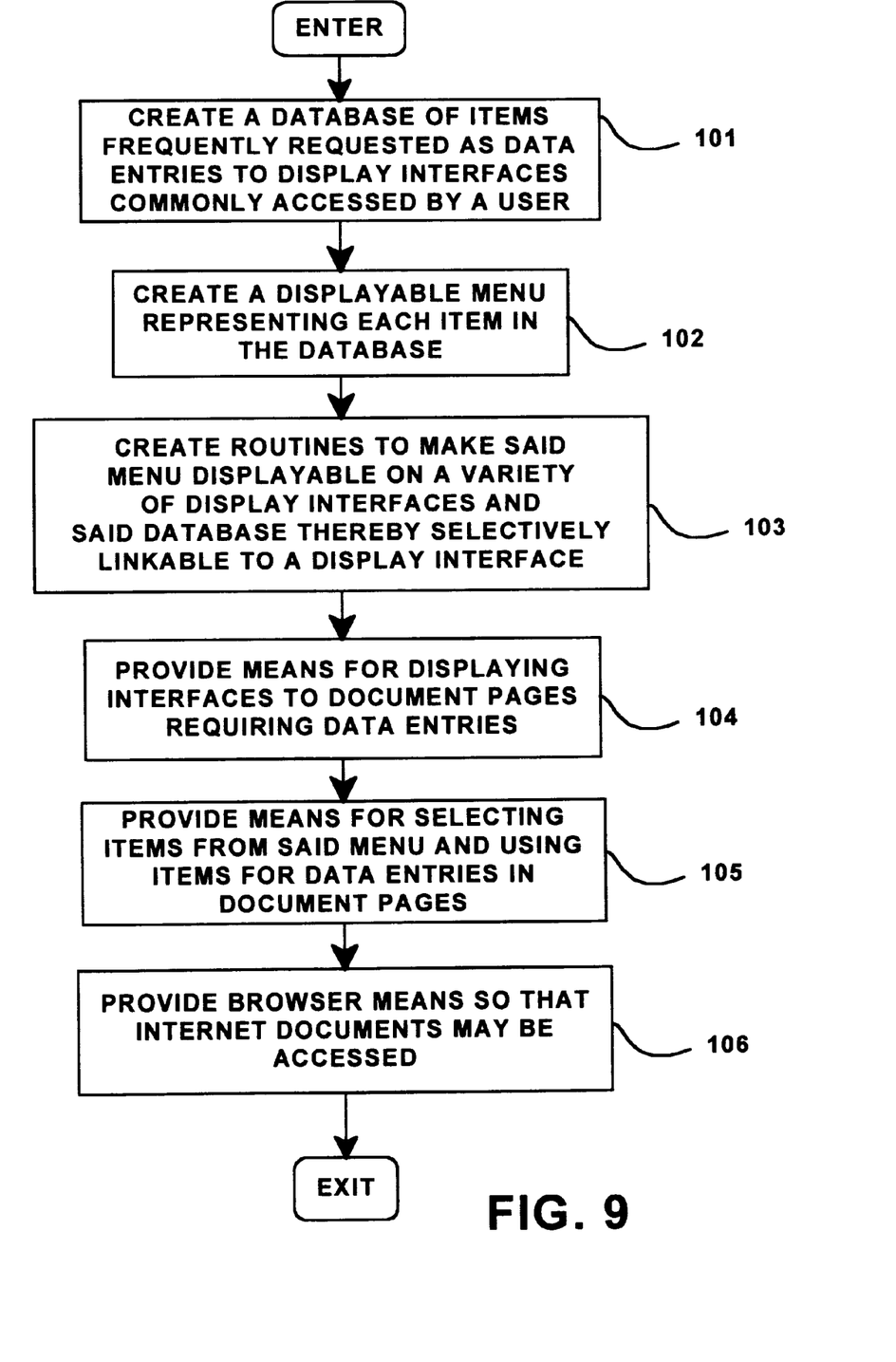
FIG. 9 is a flowchart of the basic elements of the program in a local computer controlled display system for creating and using the menu driven database of repetitively used data entries according to the present invention.
Figure 10:
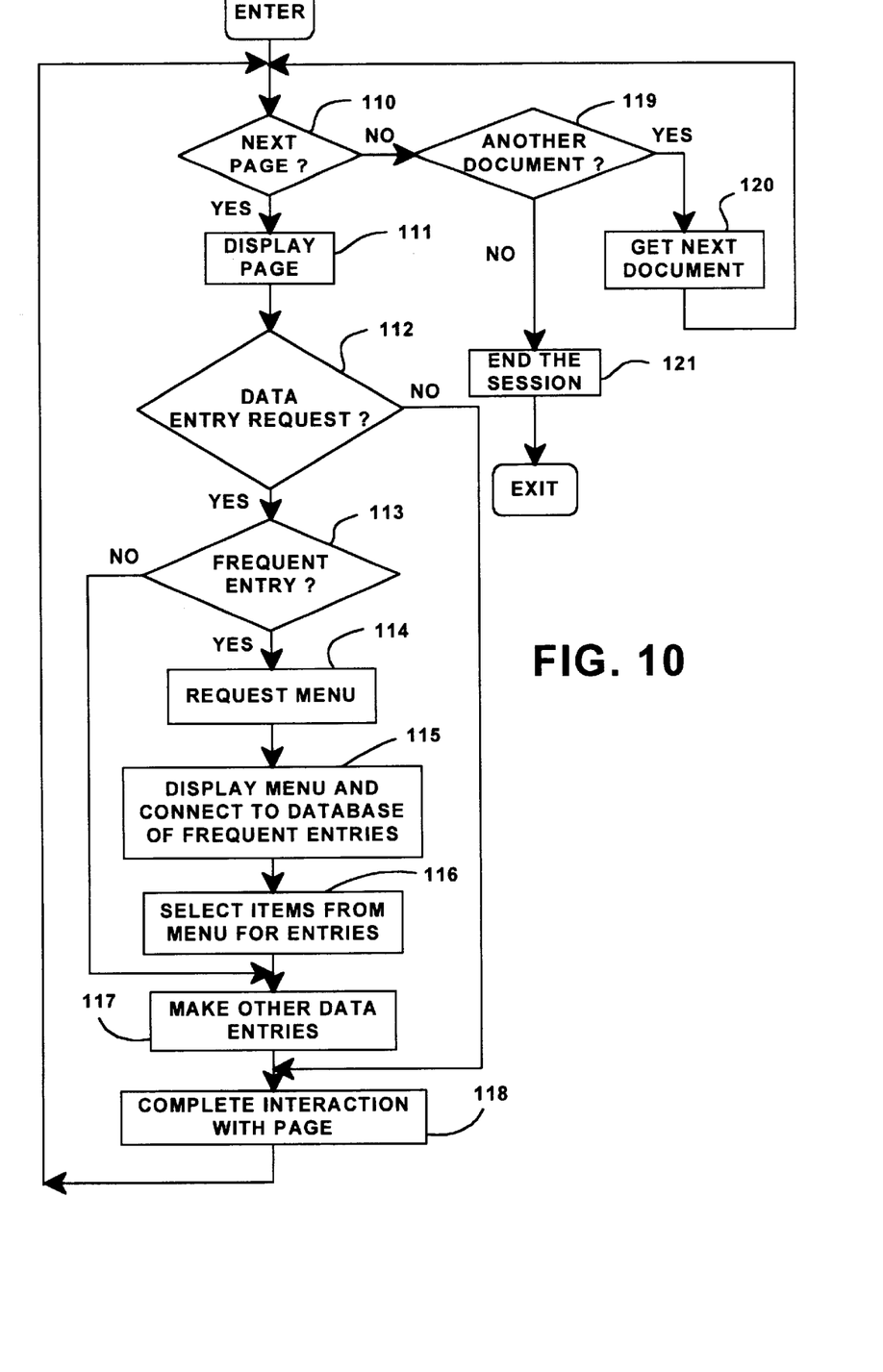
FIG. 10 is a flowchart of the steps involved in running the program set up in FIG. 9 responsive to a need for initial repetitive data entries.

Now with reference to FIGS. 9 and 10, we will describe a process implemented by the present invention in conjunction with the flowcharts of these figures. FIG. 9 is a flowchart showing the development of a process according to the present invention for creating a database of frequently used data entries and a displayable menu of such database entry items. With reference to FIG. 9, first, process step 101, in developing the program, a database of data entry items which an interactive user must frequently and repetitively enter is assembled. This database may be continuously updated by the user and customized to his own needs. Then, step 102, a displayable menu is created representative of each database entry. Each item on the menu may be the actual entry or it may be text or an icon which, when selected, activates the required data entry to be made into the selected field on the display screen. Then, step 103, routines are developed for making the menu displayable, i.e. superimposable over any selected displayed interface screen, step 104, to thereby link the menu to the display screen so that the entries may be transferred to fields in the screen or page, step 105. Appropriate browser programs for the Internet are provided so that Internet documents may be accessed, step 106. Actually, the program of the present invention may conveniently be incorporated into a browser program whereby, as pages of Internet are brought up, the database of the present invention may be accessed for the making of repetitive data entries.

The running of the process will now be described with respect to FIG. 10. First, step 110, a determination is made as to whether there is an initial, next page or screen to be displayed. If Yes, the page is displayed, step 111. Then, a determination is made, step 112, as to whether there are data entry requests on the displayed page. If Yes, then a further determination, step 113, is made as to whether any of the requested entries are frequent or repetitive entries, known or believed to be in the database of such entries. If Yes again, then the menu of the items in the database is brought up, step 114, and displayed whereby the page on the screen is linked to the database through the menu, step 115, so that items from the menu may be selected and transferred to the page as data entries, step 116. Then, or if the decision from step 113 was No, all requested entries, other than those from the menu and database, are made, step 117. At this point, or if the decision from step 112 had been No for the absence of requests for data entries, then, step 118, the user is permitted to complete his interaction with the displayed page and the process returned to decision step 110 where a determination is made as to whether there is a next page in the document. This time, assuming no next page, the flow proceeds to step 119 where a determination is made as to whether the user wishes to access another document. If Yes, then, step 120, the next document is accessed and the process repeated, commencing with step 110. If there is no other document, then, step 121, the session is ended.

One of the preferred implementations of the present invention is as an application program 40 made up of programming steps or instructions resident in RAM 14, FIG. 1, during computer operations. Until required by the computer system, the program instructions may be stored in another readable medium, e.g in disk drive 20, or in a removable memory such as an optical disk for use in a CD-ROM computer input, or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A computer controlled user-interactive display system for making data entries into data entry fields in a displayed user interface comprising:

a database comprising a plurality of data entries to be repetitively entered into data entry fields;

displayed user interface means having a plurality of display interface screens provided from sources independent of said database;

means for displaying on each of said plurality of interface screens, a menu of items each representative of one of said plurality of data entries; and means for selecting on each displayed interface screen, at least one of said items to thereby make a data entry in a data entry field on said screen.

2. The computer controlled display system of claim 1 further including means for modifying the data entries in said database.

3. The computer controlled display system of claim 1 wherein said plurality of displayed screens are in different documents.

4. The computer controlled display system of claim 3 wherein said different documents are transmitted to said display system from different sources on a network.

5. The computer controlled display system of claim 4 wherein said documents are electronic mail documents.

6. The computer controlled display system of claim 4 wherein said documents are transmitted over the Internet.

7. The computer controlled display system of claim 6 further including Internet browser means operatively associated with said database and menu.

8. In a computer controlled user-interactive display system, a method for making data entries into data entry fields in a displayed user interface comprising:

providing a database including a plurality of data entries to be repetitively entered into data entry fields;

providing displayed user interfaces having a plurality of display interface screens from sources independent of said database;

displaying on each of said plurality of interface screens, a menu of items each representative of one of said plurality of data entries; and selecting on each displayed interface screen, at least one of said items to thereby make a data entry in a data entry field on said screen.

9. The method of claim 8 further including the step of modifying the data entries in said database.

10. The method of claim 8 wherein a plurality of displayed screens are in different documents.

11. The method of claim 10 wherein said different documents are transmitted to said display system from different sources on a network.

12. The method of claim 11 wherein said documents are electronic mail documents.

13. The method of claim 11 wherein said documents are transmitted over the Internet.

14. The method of claim 13 further including an Internet browser method operatively associated with said database and menu.

15. A computer controlled display program having program code included on a computer readable medium to provide for making data entries into data entry fields in a user interactive interface to a computer controlled display comprising:

a database comprising a plurality of data entries to be repetitively entered into data entry fields;

means for displaying on each of a plurality of displayed interface screens provided from sources independent of said database, a menu of items each representative of one of said plurality of data entries; and means for selecting on each displayed interface screen, at least one of said items to thereby make a data entry in a data entry field on said screen.

16. The computer program of claim 15 further including means for modifying the data entries in said database.

17. The computer program of claim 15 wherein said plurality of displayed screens are in different documents.

18. The computer program of claim 17 wherein said different documents are transmitted to said display system from different sources on a network.

19. The computer program of claim 18 wherein said documents are electronic mail documents.

20. The computer program of claim 18 wherein said documents are transmitted over the Internet.

21. The computer program of claim 20 further including Internet browser means operatively associated with said database and menu.

* * * * *